United States Patent [19]

Sander et al.

[11] Patent Number: 4,696,762

[45] Date of Patent: * Sep. 29, 1987

[54] HYDROXYPROPYLMETHYLCELLULOSE

[75] Inventors: Eugene H. Sander; Douglas R. Cook, both of Hayfield, Minn.

[73] Assignee: Zumbro Enterprises, Inc., Hayfield, Minn.

[*] Notice: The portion of the term of this patent subsequent to Dec. 10, 2002 has been disclaimed.

[21] Appl. No.: 805,990

[22] Filed: Dec. 6, 1985

[51] Int. Cl.$^4$ .................... B01J 13/00; A23L 1/04
[52] U.S. Cl. .................... 252/311; 252/314; 252/363.5; 426/453; 426/467; 536/87
[58] Field of Search .......... 252/311, 363.5, 314; 426/467, 453; 106/197.1; 536/87, 88

[56] References Cited

U.S. PATENT DOCUMENTS 2,949,428  8/1960  Leo .................... 252/351 X
3,396,034  8/1968  Blondheim et al. .......... 536/87 X

FOREIGN PATENT DOCUMENTS 551263  1/1958  Canada .................... 252/314

Primary Examiner—John F. Terapane
Assistant Examiner—John S. Maples
Attorney, Agent, or Firm—Kinney & Lange

[57] ABSTRACT

A process is used to increase the rate and quality of dispersion of hydroxypropylmethylcellulose (HPMC) in water. The HPMC is dry blended in a fluidized bed by intermittently spraying the HPMC particles with a liquid spray while the particles are in the fluidized state causing the surfaces of the particles to become tacky and the particles to stick to each other. The particles are permitted to dry between spraying intervals and the spraying and drying is continued until agglomerated particles are formed having a moisture content of less than 25% by weight of the agglomerated particle.

7 Claims, 2 Drawing Figures

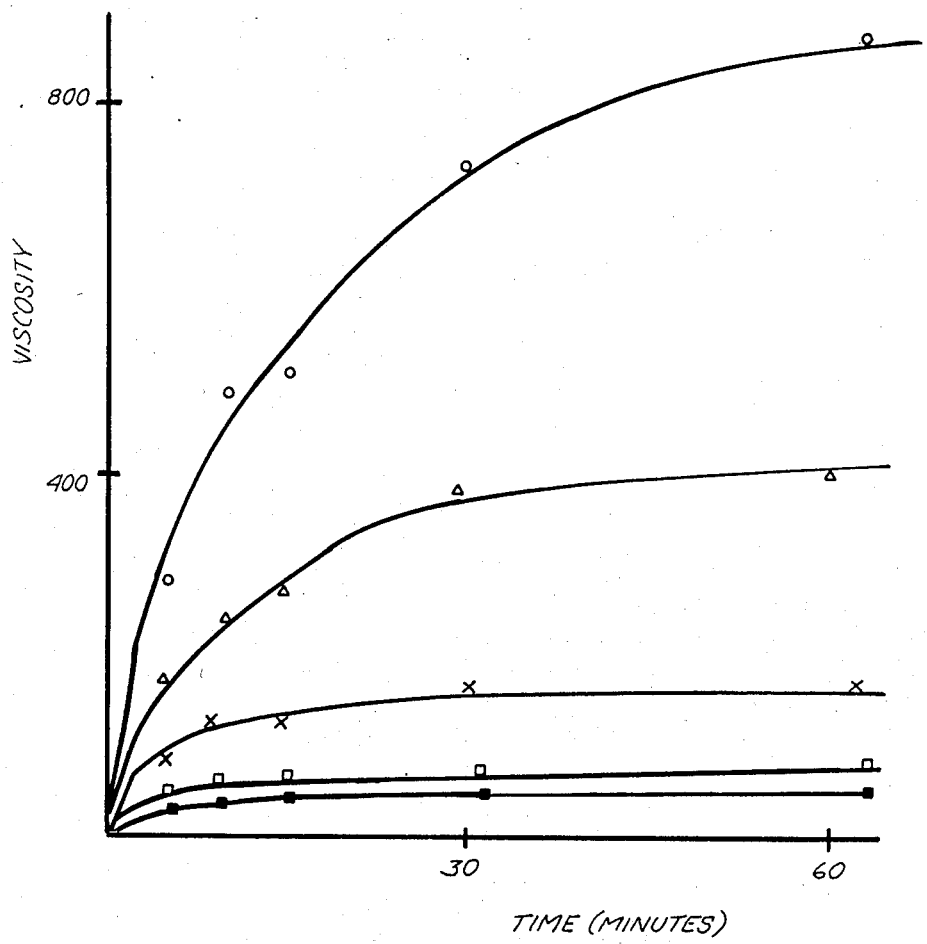

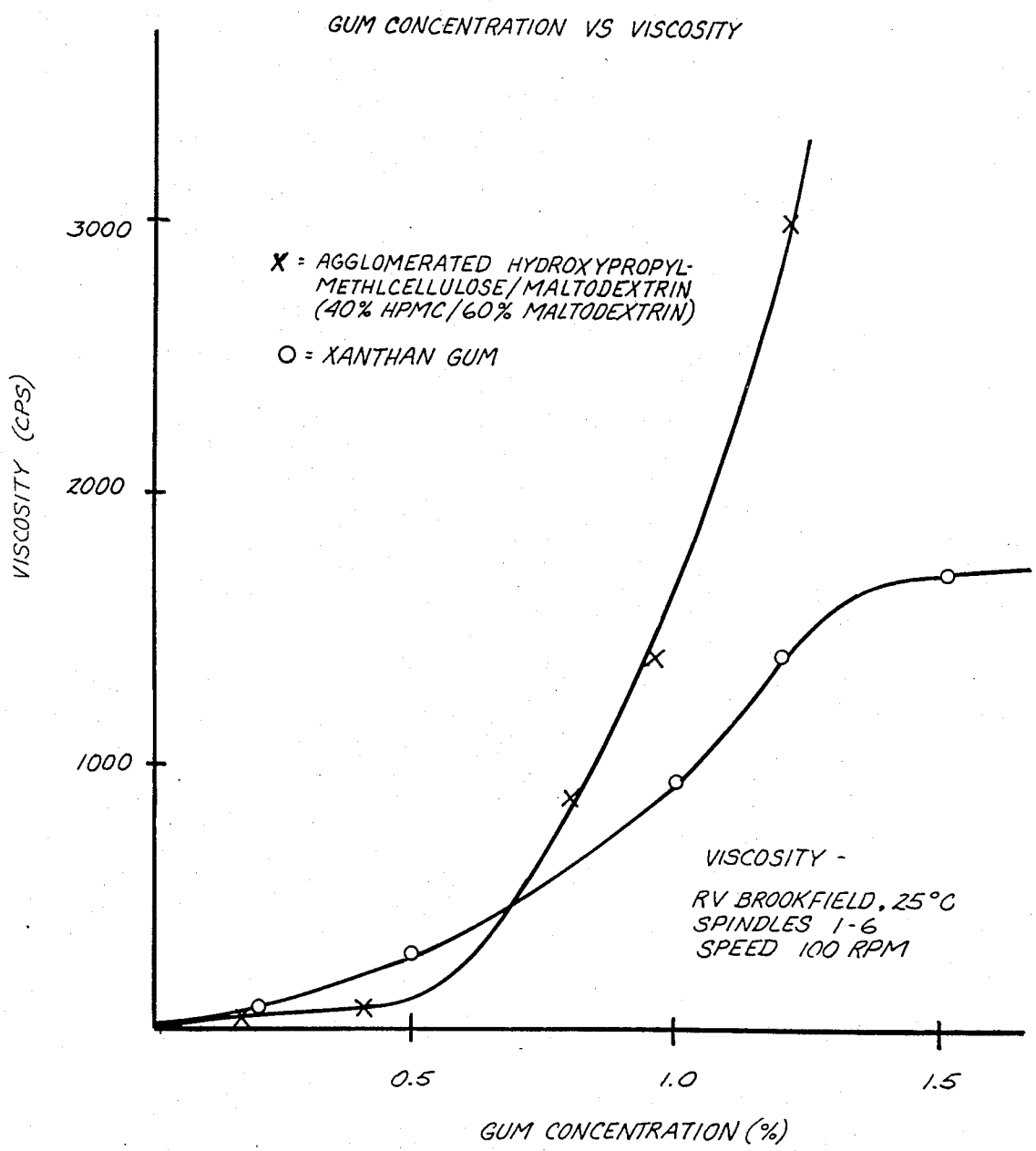

HYDROXYPROPYLMETHYLCELLULOSE

BACKGROUND OF THE INVENTION

1. Field of the Invention

The present invention relates to a process that increases the rate and quality of dispersion of hydroxypropylmethylcellulose in cold water.

2. Description of the Prior Art

Hydroxypropylmethylcellulose (HPMC) is a gum that poses unique problems to dispersibility in water. HPMC is easily dispersible in hot water but due to rapid surface wetting easily forms undispersible lumps of gum when added to cold aqueous systems. Use of HPMC has been inconvenient in many food formulating applications wherein the aqueous system had to be heated so that HPMC could be added and then cooled to ambient temperatures. When it is desired to combine HPMC with a heat-sensitive material, such as egg white, HPMC must first be dispersed in an aqueous solution that is heated; then the HPMC containing solution is cooled, and then combined with the egg white. HPMC has also been dispersed by blending with seven or more parts of a dry ingredient but the formation of lumps still occurs although the problem is somewhat reduced.

The difficulty of dispersing hydroxypropylmethylcellulose is well documented. For example, in the Hanson et al U.S. Pat. No. 2,716,072, methylcellulose is blended with sodium acetate and a finely divided solid synthetic anionic wetting agent of the group consisting of organic sulfates and sulfonates and their salts, to obtain a free flowing finely divided product. Another example of increasing the dispersibility of HPMC is to produce a composition containing HPMC and dioctyl sodium sulfosuccinate from 0.001% to 1.0% by weight of the composition, as described in the Whelan U.S. Pat. No. 3,503,895. A further example of an attempt to increase the dispersibility of hydroxypropylmethylcellulose is discussed in the Socha U.S. Pat. No. 4,373,959 wherein HPMC is lightly crosslinked with a dialdehyde such as glyoxal and a cellulose ether which has not been crosslinked.

A further known prior art technique which attempts to disperse a vegetable gums in general in an aqueous system is to first dry blend the vegetable gum with sucrose or other carrier materials. The vegetable gum and sucrose (or carrier) are then added to the water using high sheer agitation. The most effective high sheer system is to generate a vortex in the liquid with the vegetable gum and carrier being slowly added into the moving vortex to minimize localized particulate surface wetting and "fisheye" size. However, such a technique does not eliminate "fisheyes" but merely minimizes their size and occurence and is expensive in terms of time spent in reducing the "fisheye" problem. An additional problem with this technique in the case of HPMC is that HPMC is an effective foam stabilizer and thus the foam generated during high shear dispersion is difficult to dissipate.

Another technique used in the prior art which attempts to evenly disperse the vegetable gum in water, disperses the vegetable gum first thereby maximizing the water/vegetable gum ratio and preventing interference by other components in the gum hydration process. This technique is typically used for multi-component foods wherein several dry ingredients must be re-hydrated. The vegetable gum is typically dispersed in a vortex and slowly added thereto to minimize localized particulate surface wetting and "fisheye" size.

Another prior art process is disclosed in the Leo U.S. Pat. No. 2,949,428 wherein locus bean gum is rendered cold water soluble by agitating the locust bean gum with sugar in the presence of steam or a fine mist of water. The resulting mixture is a solid, foamy, spongy mass which is then heated. However, the physical state of the locust bean gum, being in a spongy mass, is not particularly suited for later use in a product such as a dry soup mix due to its high moisture content.

Another process which is highly successful in agglomerating gums and other food grade particulates used as thickening agents is described in patent application Ser. No. 06/524,145 entitled "Product and Process for Improving the Dispersion of a Vegetable Gum in Water," which will issue into U.S. Pat. No. 4,557,938 on Dec. 10, 1985. Agglomerated particles containing xanthan gum made by this process have been commercially available for more than one year.

SUMMARY OF THE INVENTION

The present invention is a method for providing an agglomerated HPMC particle which is highly dispersible in an aqueous solution regardless of the temperature. The agglomerated particle is characterized by its quick and immediate dispersion in the aqueous solution without the formation of lumps or fisheyes. The method includes fluidizing HPMC particles (with or without a carrier material) in a gaseous stream and intermittently spraying the particles with a liquid spray while the particles are in a fluidized state, causing the surface of the HPMC particles to become tacky and the particles to stick to each other. The particles are permitted to dry between spraying intervals and the spraying and drying of the particles is continued until an agglomerated particle is formed. The agglomerated particle has a moisture content of less than 25% by weight of the agglomerated particle.

The resultant agglomerated HPMC particle disperses easily in an aqueous solution whether the temperature is hot or cold. The agglomerated HPMC particle has been dispersed in water as cold as 4° C., reaching maximum viscosity within 60 minutes.

BRIEF DESCRIPTION OF THE DRAWINGS

FIG. 1 is a graph showing the dispersibility of agglomerated hydroxypropylmethylcellulose versus time.

FIG. 2 is a graph comparing the viscosity versus gum concentration of co-agglomerated 20% hydroxypropylmethylcellulose 80% maltodextrin (10 DE) to that of xanthan gum.

DETAILED DESCRIPTION OF THE PREFERRED EMBODIMENTS

The present invention increases the quality and the rate of dispersion of hydroxypropylmethylcellulose (HPMC) in an aqueous solution regardless of the temperature of the solution. The agglomerated HPMC disperses within the solution quickly and easily without the formation of lumps or "fisheyes."

Methylcellulose is prepared by treating cellulose fibers, usually cotton linters or wood pulp, with caustic-soda solutions to yield an alkali cellulose. This is then treated with methylchloride to yield the methylether of cellulose or methylcellulose. A further reaction with propylene oxide gives a hydroxypropylmethylcellulose. In the United States, Dow Chemical is a primary producer of these materials sold under the trademark "ME-THYOCEL."

All reference in the present application to percent composition is by weight percent if not specifically stated.

HPMC is agglomerated, alone or with a food grade particulate carrier, by a process described in application Ser. No. 06/524,145 filed Aug. 17, 1983 entitled "Product and Process for Improving the Dispersion of a Vegetable Gum in Water," which will issued into U.S. Pat. No. 4,557,938 on Dec. 10, 1985, and which is owned by the assignee of the present application.

HPMC is one of the most difficult, if not the most difficult, gum to disperse into solution at temperatures below 30° C. The ease of dispersing an agglomerated HPMC product using the process described in application Ser. No. 06/514,145, was an unexpected result to the applicant.

The agglomerated HPMC may contain from 1 to 100 parts of HPMC with the balance provided by a suitable food grade particulate carrier, such as starch, maltodextrin, corn syrup solids, sugar, salt, $CaCO_3$, or another vegetable gum. The agglomerated HPMC is easily dispersible in cold water (15° C. or less).

A comparison of the dispersibility of agglomerated HPMC, agglomerated with maltodextrin (20 parts HPMC/80 parts maltodextrin 10 DE), to unagglomerated HPMC is illustrated in Table 1. Ten grams of the agglomerated form of HPMC or 10 grams of a comparable unagglomerated dry blend of HPMC and maltodextrin was poured into 500 milliliters of 13° C. cold water which was stirred with a magnetic stirrer having a vortex reaching the 200 ml. mark on a 600 ml. beaker ($\frac{1}{3}$ of the distance from the bottom of the beaker). The material was then stirred for five minutes and poured through a 200 mesh standard sieve to collect any undispersed lumps of product. The material on the sieve was dried four hours in a 200° F. oven and weighed. The unagglomerated HPMC formed lumps not dissolved after five minutes of stirring. The agglomerated HPMC dispersed immediately forming a lump-free solution.

TABLE 1

| Sample | wt. % of Original Material Collected on Sieve | Visual Observation |
|---|---|---|
| 20% HPMC*/ 80% 10 DE maltodextrin dry blend | 39 | Many Large Lumps |
| 20% HPMC*/ 80% 10 DE maltodextrin agglomerated by described process | 5 | No Lumps |

*Hydroxypropylmethylcellulose/Methocel K4M Premium, Dow Chemical, U.S.A.

Several samples of agglomerated HPMC were evaluated as to the amount of time taken to reach maximum viscosity. Regardless of the viscosity characteristics, all of the samples illustrated in FIG. 1 dispersed in cold (15° C.) water instantly and reached maximum viscosity within 60 minutes. Three different types of HPMC sold by Dow Chemical were used in the experiment. All three samples were agglomerated to form a mixture having 20 parts HPMC to 80 parts of 10 DE maltodextrin. In addition, two of the Dow Chemical HPMC products were agglomerated forming an agglomerated particle having 40 parts of HPMC to 60 parts of 10 DE maltodextrin. Each of the above-mentioned samples produced a different effective viscosity, but maximum viscosity in each case was reached within 60 minutes with no lumps or fisheyes being formed in solution.

A further illustration of the properties of the present invention is illustrated in FIG. 2. In FIG. 2, the viscosity of an agglomerated HPMC (40% HPMC by weight and 60% maltodextrin by weight) was compared to that of unagglomerated xanthan gum. The comparison in FIG. 2 compares equal gum concentrations and the viscosity effected by those gum concentrations. The agglomerated HPMC was hand stirred and resulted in a homogeneous solution. The xanthan gum, however, required a high shear mixture to create a homogeneous solution. At a 0.7% gum level, the agglomerated HPMC and the xanthan gum have the same viscosity of 400 centipoise in cold water (4° C.). At equal gum concentrations above 0.6% gum by weight, the viscosity of the agglomerated HPMC is greater than that of xanthan gum. The agglomerated HPMC product can be used to substitute for the more expensive xanthan gum in production of viscosity in food systems. The agglomerated HPMC product, moreover, has the advantage of dispersibility not possessed by the xanthan gum. Thus, unexpectedly the co-agglomerated HPMC/maltodextrin product of this invention was able to produce viscosities comparable to those generated by xanthan gum but without requiring commonly used high shear techniques for dispersing xanthan gum.

Although the present invention has been described with reference to preferred embodiments, workers skilled in the art will recognize that changes may be made in form and detail without departing from the spirit and scope of the invention.

What is claimed is:

1. A method of dispersing a hydroxypropylmethylcellulose (HPMC) in an aqueous solution, regardless of the temperature of the solution, the method comprising:
   agglomerating HPMC in a gaseous air stream by intermittently spraying the particles with a liquid spray while the particles are in a fluidized state causing the surfaces of the particles to become tacky and the particles to stick to each other and permitting the particles to dry between spraying intervals and continuing spraying and drying of the particles until agglomerated particles are formed; and
   dispersing the agglomerated particles in an aqueous solution.

2. The method of claim 1 wherein the particles are dispersed in an aqueous solution having a temperature of at least below 15° C.

3. The method of claim 1 wherein the HPMC particles are agglomerated with a food grade particulate carrier.

4. The method of claim 3 wherein the HPMC particles are agglomerated with the food grade particulate carrier in a range of 1% to 99% of the HPMC/food grade particulate carrier mixture.

5. A method for providing a hydroxypropylmethylcellulose (HPMC) particle dispersible in an aqueous solution regardless of the temperature of the solution, the method comprising:
   fluidizing the HPMC particles with a gaseous stream;
   intermittently spraying the particles with a liquid spray while the particles are in a fluidized state causing the surfaces of the particles to become tacky and the particles to stick to each other;
   permitting the particles to dry between spraying intervals; and continuing spraying and drying of the particles until agglomerated particles are formed having a moisture content of less than 25% by weight of the agglomerated particle.

6. The method of claim 1 wherein the HPMC particles are fluidized with a food grade particulate carrier.

7. The method of claim 6 wherein the HPMC particles are fluidized with a food grade particulate carrier in a range of 1% to 90% by weight of the HPMC/food grade carrier mixture.

* * * * *

UNITED STATES PATENT AND TRADEMARK OFFICE
CERTIFICATE OF CORRECTION

PATENT NO. : 4,696,762

DATED : September 29, 1987

INVENTOR(S) : Eugene H. Sander et al.

It is certified that error appears in the above-identified patent and that said Letters Patent is hereby corrected as shown below:

Column 6, line 1, delete "Claim 1" and insert --Claim 5--.

Signed and Sealed this

Sixteenth Day of February, 1988

Attest:

DONALD J. QUIGG

Attesting Officer

Commissioner of Patents and Trademarks